(No Model.) 2 Sheets—Sheet 1.
F. C. McDONALD.
STARTING AND DRAFT MECHANISM FOR STREET CARS.
No. 397,740. Patented Feb. 12, 1889.
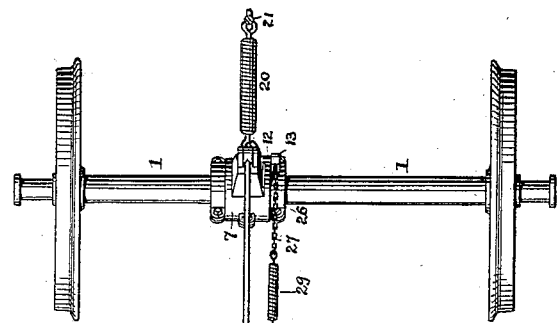
FIG. 1.
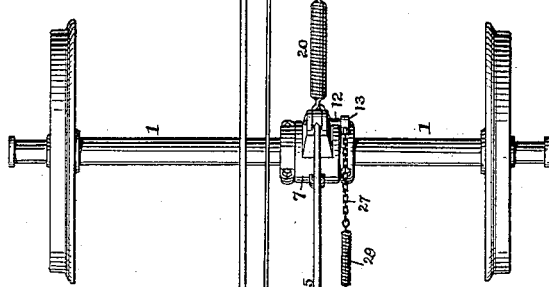
FIG. 2.
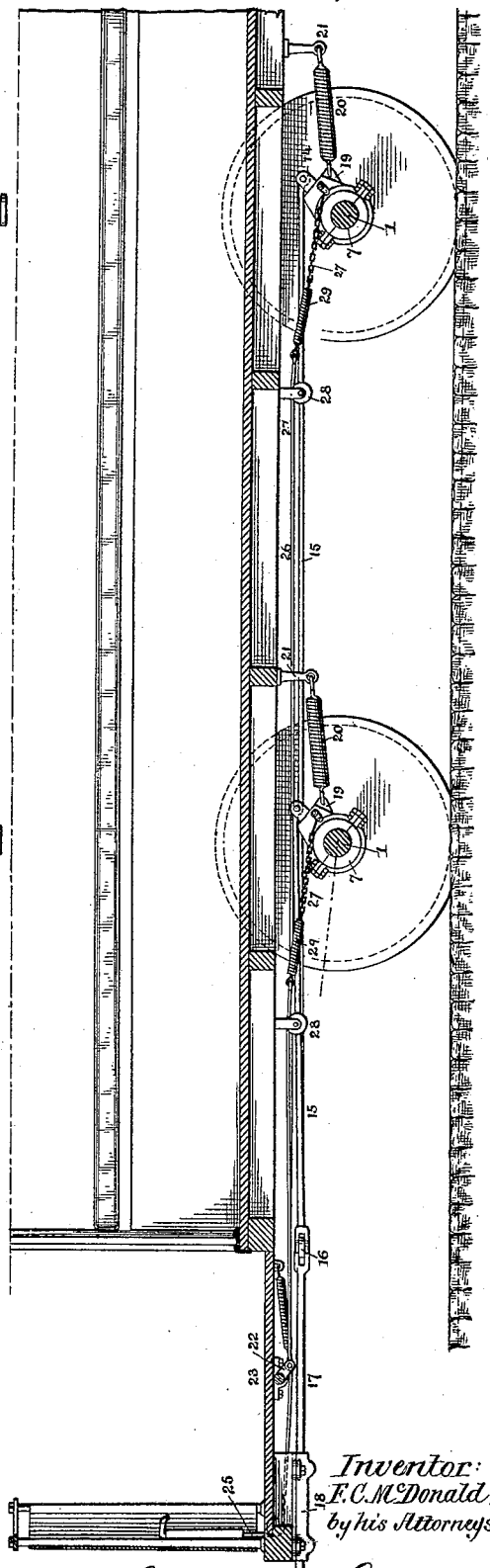
Witnesses:
Inventor:
F. C. McDonald
by his Attorneys
Howson & Howson

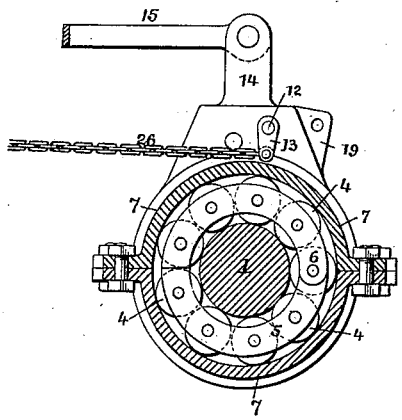
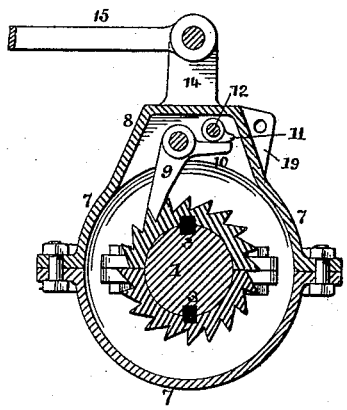
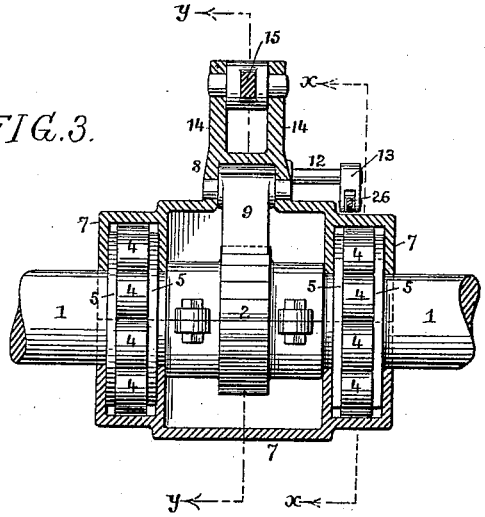
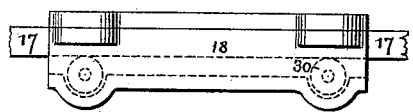
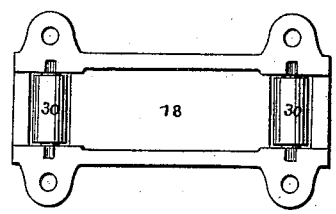

UNITED STATES PATENT OFFICE.

FRED C. McDONALD, OF NEW YORK, N. Y.

STARTING AND DRAFT MECHANISM FOR STREET-CARS.

SPECIFICATION forming part of Letters Patent No. 397,740, dated February 12, 1889.

Application filed December 22, 1887. Serial No. 258,676. (No model.)

*To all whom it may concern:*

Be it known that I, FRED C. MCDONALD, a citizen of the United States, and a resident of New York city, New York, have invented certain Improvements in Starting and Draft Mechanism for Street-Cars, of which the following is a specification.

The object of my invention is to construct starting and draft mechanism for street-cars, whereby the starting of the car is accomplished easily and without jerk or jar, and whereby also the power of the draft animal or team is exerted more effectively and with less strain than usual, not only in starting the car, but also in the subsequent pulling of the same. This object I attain in the manner which I will now proceed to describe, reference being had to the accompanying drawings, in which—

Figure 1 is a plan view showing the two axles of a car with starting and draft mechanism constructed in accordance with my invention. Fig. 2 is a longitudinal section of part of a car, showing the improved starting and draft mechanism in elevation. Fig. 3 is a transverse section, partly in elevation, of part of one of the axles and the draft-box thereon. Fig. 4 is a section on the line $x\,x$, Fig. 3. Fig. 5 is a section on the line $y\,y$, Fig. 3. Fig. 6 is a side view of the guide-box for the draft-bar, and Fig. 7 is a plan view of said guide-box with the cover-plate removed.

I will first describe, with reference to Figs. 3, 4, and 5, the construction of my improved draft-box and starter, leaving to a later portion of the specification the description of the draft mechanism connected thereto.

To each of the axles 1 of the car is connected a ratchet-wheel, 2, preferably made in sections bolted together, as shown in Figs. 3 and 5, for convenience of application to the axle, the ratchet-wheel being also, by preference, secured against circumferential movement on the axle by means of one or more keys or feathers, 3, as shown in Fig. 5. Mounted upon the axle, on each side of the hub of the ratchet-wheel, are a series of anti-friction rollers, 4, these rollers being carried by frames 5, which are preferably made in two parts hinged together, as at 6, Fig. 4, so that the frames can be separated for application to the axle. Mounted upon the rollers 4 is a draft-box, 7, which completely incloses and protects the ratchet-wheel, the rollers, and their carrying-frames, the opposite ends of the box fitting loosely to the axle, so as to prevent the access of dust, dirt, or other foreign matter to the interior of the box. The draft-box is likewise made in two parts for convenience of application, and on the upper part of the box is a projection, 8, in which is hung a pawl, 9, adapted to engage with the ratchet-wheel 2, said pawl having a finger, 10, under control of a toe, 11, on a rock-shaft, 12, which is adapted to bearings in the projection 8, and has at one end an arm, 13.

Referring now to Figs. 1 and 2, it will be observed that to lugs 14 on the top of each draft-box is connected the rear end of a rod, 15, the front ends of which are connected to an evener, 16, hung to the inner end of the draft-bar 17, which is guided in a box, 18, secured to the under side of the front platform of the car, the front end of the draft-bar being provided with a hook or equivalent means for attaching the draft animal or team to the bar. To a lug, 19, on the draft-box is connected a spring, 20, the rear end of which is connected to a stud, 21, on the frame of the car, the tendency of this spring being to pull the draft-box rearward to the position shown in Fig. 2. When draft is applied to the box, however, it is drawn forward until its center line assumes about the position indicated by the dotted line in Fig. 2, the movement being equivalent to about one-third of a turn of the box. This movement, owing to the engagement of the pawl 9 and ratchet-wheel 2, is imparted to the axle and to the wheels thereon, and thus effects the starting of the car, the movement of the car being easy, owing to the fact that it is effected by turning the wheels, and not by a direct jerk upon the frame-work of the car, while the strain upon the draft animal or team is less than would be caused by a direct pull upon the frame of the car, owing to the leverage gained by the use of the draft-box, the point of connection of the rod 15 to said box being somewhat more than twice as far from the center of the axle as is the periphery of the ratchet-wheel upon which the power is exerted.

Not only do the draft-boxes serve as the means of starting the car, but they also constitute the means whereby the pull of the draft-bar is exerted upon the car after the starting of the same, this pull being exerted upon the axles, which are the most effective points for the application of power, and any loss due to friction being practically eliminated by the employment of the anti-friction-roller bearings for the draft-box.

When the boxes are subjected to draft and occupy the forward position, (indicated by dotted lines in Fig. 2,) the pawl 9 falls clear of the ratchet-wheel; hence there will be no clicking noise, such as would be caused if the pawl were continuously in engagement with the said wheel.

When it is desired to move the car backward, the pawl must be retracted, so as to be clear of the teeth of the ratchet-wheel, and this is effected by the action of the toe 11 upon the finger 10 of the pawl.

In order to provide for the convenient and simultaneous release of both pawls, the arms 13 of the rock-shafts 12, carrying the toes 11, are connected to arms 22 on a rock-shaft, 23, adapted to bearings on the under side of the front platform of the car, and having another arm, 24, which is connected to a slide, 25, suitably guided on the inner side of the front dasher of the car in such position that its upper end is within easy reach of the driver.

The connections between the arms 13 and the arms 22 comprise rods 26, chains 27, supporting-rollers 28, and springs 29, whereby each connection is always kept under tension, but is free to yield so as to insure the proper operation of the rock-shafts of both boxes.

It will be evident that when the pawls 9 are in engagement with the ratchet-wheels 2 the wheels are locked against back movement, so that when the car is stopped on an upgrade there is no necessity for keeping the brakes on the wheels during the whole time, the brake being removed as soon as the car comes to a standstill, and the car is started from this standing position with the brakes off, instead of, as usual, having to be started with the brakes still on the wheels, or after the car has commenced to run backward down the grade.

In the practical use of my improved starting and draft mechanism I have found that the wear and tear of rolling-stock and the strain upon the shoulders of draft-animals are much reduced, the comfort of the passengers being enhanced by the easy starting of the car, and the necessity of retiring the draft-animals from active service at intervals by reason of sore shoulders being completely overcome. Moreover, I find that the draft animal or team can be put into a trot in about one-half the time after the starting of the car as compared with the time required after starting a car having the ordinary draw-head, thus effecting a very considerable saving in time, especially on lines where the stoppages are frequent. To these advantages of operation possessed by my invention may be added the advantages of construction due to the fewness, simplicity, light weight, and low cost of the parts comprising the apparatus, and to the fact that there is very little likelihood of any of these parts getting out of order, so as to become inoperative and require attention.

Although I prefer, in carrying out my invention, to apply a draft-box to both of the axles of the car, it will be evident that the main features of my invention would be embodied in a draft apparatus using the box upon but one axle, and although it is also preferable to secure the ratchet-wheel to the axle and to hang the pawl to the draft-box the reverse construction may be adopted, if desired—that is to say, the pawl may be hung to the axle and the draft-box may be provided with an internal ratchet-wheel engaging said pawl.

The guide-box 18 for the draft-bar is provided with suitable friction-rollers, 30, which carry the weight of said rod and ease the movement of the same.

I claim as my invention—

1. The combination of the axle, pawl-and-ratchet starting mechanism, a box hung to the axle and carrying one of the elements of said mechanism, a draft-bar connected to said box, and anti-friction-roller bearings interposed between the box and the axle, all substantially as specified.

2. The combination of the two axles of a car, a draft-box with pawl-and-ratchet starting mechanism on each axle, and a draft-bar connected to both of said boxes and having a whiffletree-connection at the front end, all substantially as specified.

3. The combination of the two axles of the car, each having a draft-box with pawl-and-ratchet mechanism, a draft-rod, an evener carried thereby, and rods extending from said evener to the draft-boxes of the axles, all substantially as specified.

4. The combination of the axle, the ratchet-wheel secured thereto, the draft-box hung to the axle and having a pawl engaging with said ratchet-wheel, and a rock-shaft carried by the box and having a toe for acting upon the pawl to throw it out of gear, all substantially as specified.

5. The combination of the axle, the ratchet-wheel secured thereto, the draft-box having a pawl engaging with said axle, the draft-rod connected to said box, a releasing-shaft carried by the box, an operating-slide on the platform of the car independent of the draft-rod, and means for connecting said slide to the releasing-shaft of the draft-box, all substantially as specified.

6. The combination of the two axles of a car, the draft-boxes, each having pawl-and-ratchet mechanism, and a releasing-shaft for the pawl, an operating-slide on the platform of the car, and connections between said slide
5 and the releasing-shaft of each draft-box, each of said connections having an interposed spring, all substantially as specified.

In testimony whereof I have signed my name to this specification in the presence of two subscribing witnesses.

FRED C. McDONALD.

Witnesses:
 CHARLES E. GREENMAN,
 THOMAS GALVIN.